United States Patent Office 3,172,803
Patented Mar. 9, 1965

3,172,803
COMPOSITION AND METHOD OF KILLING INSECTS WITH PHOSPHORANOATE ESTERS
Gail H. Birum, Kirkwood, Mo., assignor to Monsanto Company, a corporation of Delaware
No Drawing. Filed Aug. 22, 1962, Ser. No. 218,518
18 Claims. (Cl. 167—30)

This invention is directed to new insecticidally active sulfur-containing organic compounds of phosphorus. More specifically, this invention is directed to new phosphoranoate esters and their use in insecticidal compositions.

It is an object of this invention to provide new sulfur-containing phosphoranoate esters. It is an object of this invention to provide insecticidal compositions containing as an active ingredient therein new sulfur-containing phosphoranoate esters. It is yet another object of this invention to provide a method for destroying insects comprising exposing said insects to a toxic quantity of a new sulfur-containing phosphoranoate ester. Other objects and advantages of this invention will be apparent from a consideration of the accompanying disclosure and the appended claims.

The phosphoranoate esters of this invention can be represented as having the structure

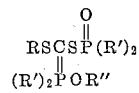

wherein R is selected from the group consisting of aryl, haloaryl, and alkaryl radicals having from 6 to 12 carbon atoms, R' is selected from the group consisting of hydrocarbyl, hydrocarbyloxy, and halohydrocarbyloxy radicals having from 1 to 6 carbon atoms, and R" is selected from the group consisting of aliphatic and halogen-substituted aliphatic radicals having from 1 to 6 carbon atoms.

The compounds having the above described structure are prepared when an aryl, haloaryl, or an alkaryl chlorodithioformate is reacted with a neutral ester of a trivalent phosphorus acid having at least one aliphatic or halogen-substituted aliphatic radical of from 1 to 6 carbon atoms which is bonded through oxygen to the phosphorus atom according to the following general equation

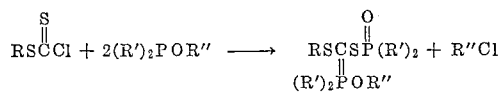

wherein R, R', and R" are as defined above.

The new insecticidal compositions of this invention contain as an essential active ingredient, a sulfur-containing phosphoranoate ester of the above general formula.

Further, this invention provides a method for killing insects which comprises exposing said insects to a toxic quantity of a sulfur-containing phosphoranoate ester of the above general formula.

The compounds of this invention have the characteristic structure

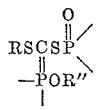

which contains a phosphorus to carbon double bond and two phosphorus atoms, each differing from the other with respect to its substituents. The nature of the radicals that satisfy the indicated free valences of the phosphorus atoms depends upon the type of trivalent phosphorus ester that is used as the starting material. These compounds may be named as substituted methylene derivatives of phosphoranoic, phosphorandioic, and phosphoranetrioic acids, the name being dependent upon the type of trivalent phosphorus ester that is used as a starting material. Thus, the compound having the structure

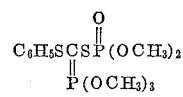

is trimethyl [(phenylthio)(dimethoxyphosphinylthio) methylene]phosphoranetrioate, while the compound having the structure

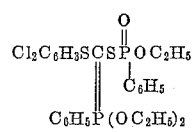

is diethyl [(dichlorophenylthio)(ethoxyphenylphosphinylthio)methylene]phenylphosphoranedioate, and the compound having the structure

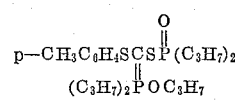

is propyl [(p-methylphenylthio)(dipropylphosphinylthio) methylene]dipropylphosphoranoate.

The trivalent phosphorus esters useful for the purpose of preparing the compounds of this invention are the phosphite, phosphonite, and phosphinite esters having at least one aliphatic or halogen-substituted aliphatic radical which is bonded through an oxygen atom to the phosphorus atom and contains from 1 to 6 carbon atoms. The remaining valences of the phosphorous ester starting material may be satisfied by hydrocarbyl, hydrocarbyloxy, or halohydrocarbyloxy groups having from 1 to 6 carbon atoms. Phosphite esters are preferred for reasons of economy and ready availability. However, the phosphonite and phosphinite esters may also be used. Alkyl and haloalkyl phosphites useful for the preparation of the present compounds are the simple or mixed trialkyl phosphites such as trimethyl, triethyl, tri-n-propyl, triisopropyl, tri-n-butyl, tri-tert-butyl, tri-n-amyl, triisoamyl, tricyclohexyl, trihexyl, dimethyl ethyl, di-n-propyl methyl, butyl dimethyl, amyl diethyl, ethyl methyl propyl, diethyl cyclohexyl, 4-chlorocyclohexyl diethyl, and ethyl hexyl methyl phosphites; the simple or mixed haloalkyl phosphites such as tris(2-chloroethyl), tris(2-bromopropyl), tris(2,2,2-trichloroethyl), tris(3-idopropyl), tris(2-fluoroethyl), tris(2,3,3-trichloropropyl), tris(2-bromo-3-chloropropyl), and tris(6-bromohexyl) phosphites; and phosphites in which both alkyl and haloalkyl radicals are present such as diethyl 2-chloropropyl phosphite or bis(4-chlorobutyl) propyl phosphite.

Examples of phosphite esters containing aromatic radicals therein that may be used in this invention are compounds such as methyl diphenyl phosphite, diethyl phenyl phosphite, isopropyl 2-chloropropyl phenyl phosphite, n-butyl 4-bromoamyl 4-chlorophenyl phosphite, bis(2-chloroethyl) phenyl phosphite, bis(4-iodohexyl) 2-chlorophenyl phosphite, and 3-fluorobutyl bis(2-chlorophenyl) phosphite.

Other phosphite esters that may be used are, e.g., those having olefinic unsaturation therein; that is, phosphite esters containing alkenyl, alkadienyl, and/or cycloalkenyl radicals having from 1 to 6 carbon atoms therein. Examples of such compounds are triallyl, tris(3-pentenyl), diallyl methyl, bis(2-butenyl) ethyl, bis(3-hexenyl) propyl, bis(2-chloro-3-pentyl) propyl, diethyl 2-butenyl, bis(1,3-butadienyl) propyl, diethyl 3-cyclohexenyl, and diallyl 3-chlorohexyl phosphites.

Phosphite esters having acetylenic unsaturation in the ester radical can also be used. Examples of such compounds are: tris(2-butynyl), tris(3-hexynyl), diethyl 2-butynyl, bis(2-chloropropyl) 3-pentynyl, bis(4-hexynyl) 2-bromopropyl, and propyl 2-propynyl 2-chloropropyl phosphites.

Phosphonite esters having at least one aliphatic or halogen-substituted aliphatic radical bonded through oxygen to the phosphorus atom will also react with the chlorine-containing organic sulfur compounds descirbed above to provide compounds of the invention. Examples of phosphonite esters that may be used are the simple or mixed alkyl phosphonites, e.g., dimethyl methyl-, diethyl ethyl-, di-n-propyl propyl-, and ethyl hexyl butylphosphonites; the haloalkyl phosphonites such as bis(2-chloroethyl) ethyl-, bis(2,3-dichloropropyl) ethyl-, bis(4-bromohexyl) hexyl-, ethyl 2-iodopropyl ethyl-, and bis(2-bromoethyl) amyl phosphonites; the cycloalkyl phosphonites such as ethyl cyclohexyl ethyl-, dicyclopentyl propyl-, and bis-(2-chloropropyl) cyclohexylphosphonites. Phosphonite esters containing olefinic unsaturation in the hydrocarbyl groups may also be used; e.g., bis(2-butenyl) 2-butenyl-, diallyl allyl-, diallyl ethyl-, dimethyl 4-hexenyl, propyl 2-butenyl propyl, diethyl 1,3-butadienyl-, and bis(2-chloroethyl) 3-cyclohexenylphosphonites. Examples of phosphonite esters containing acetylenic unsaturation which may be used are bis(3-pentynyl) ethyl-, dipropyl 2-butynyl-, bis(2-bromo-4-hexynyl) methyl-, propyl 2-propynyl propyl-, and 3-pentynyl allyl ethylphosphonites. Phosphonite esters containing aromatic radicals may also be used; e.g., allyl phenyl phenyl-, ethyl phenyl phenyl-, 2-chlorophenyl propyl ethyl-, 2-chloroethyl phenyl cyclohexyl-, bis(2-chloropropyl) phenyl-, and bis(2,3-dichloropropyl) phenylphosphonites.

Although less commonly available at the present time, phosphinite esters may also be used to prepare compounds of the present invention by reaction with chlorine-containing organic sulfur compounds described above. Such phosphinite esters useful in this invention are those having organic radicals the same as those described above in more detail for the phosphite and phosphonite esters. However, for purposes of illustration, a few examples of phosphinite esters useful in this invention are ethyl dimethyl-, allyl diethyl-, 2-chloroethyl diphenyl-, propyl hexylphenyl-, 2-chloropropyl dibutyl-, amyl bis(3-pentynyl)-, and 2-propynyl-diphenylphosphinites.

Any of the types of trivalent phosphorus esters listed above may be reacted with a chlorodithioformate compound having an aryl, haloaryl, or alkylaryl radical of from 6 to 12 carbon atoms attached thereto to prepare the compounds of this invention. Examples of such chlorodithioformate compounds that may be used are, e.g., phenyl, tolyl, o-, m-, or p-xylyl, mesityl, tetramethylphenyl, pentamethylphenyl, 2-, 3-, or 4-ethyl, or butylphenyl, naphthyl, and biphenyl chlorodithioformates; compounds having in the aryl or alkaryl radicals substituents such as the chloro, nitro, cyano, and alkoxy radicals, for example, 5-bromoamylphenyl, 3-cyanopropylphenyl, 2-, 3-, 4-chlorophenyl, 2,3-dichlorophenyl, 2,4-dibromophenyl, 2,3,4,5-tetrachlorophenyl, pentachlorophenyl, 2-, 3-, or 4-nitrophenyl, 2,4-dinitrophenyl, 2-chloro-4-nitrophenyl, 4-bromo-4'-xenyl, 2-chloroethyl-4-tolyl, 2-nitropropyl phenyl, β-ethoxynaphthyl, and 2-chloro-4-ethoxybenzyl chlorodithioformates.

When the selected trivalent phosphorus ester used as the starting material in the reaction with a chlorodithioformate compound is a phosphite ester, as defined above, the product obtained is a phosphoranetrioate ester, examples of which are:

Trimethyl [(phenylthio)(dimethoxyphosphinylthio)-methylene]phosphoranetrioate, obtained by reacting phenyl chlorodithioformate with trimethyl phosphite;

Tris(2-chlorobutyl){(p-chlorophenylthio) [bis(2-chlorobutoxy)phosphinyl]methylene}phosphoranetrioate, obtained by reacting p-chlorophenyl chlorodithioformate and tris(2-chlorobutyl) phosphite;

Triallyl [(p-tolylthio)(diallyloxyphosphinylthio)methylene]phosphoranetrioate, obtained by reacting p-tolyl chlorodithioformate and triallyl phosphite;

Tris(2-butnyl){(pentachlorophenylthio) [bis(2-butynyloxy)phosphinylthio]methylene}phosphoranetrioate, obtained by reacting pentacholorophenyl chlorodithioformate and tris(2-butynyl) phosphite; and Bis(2-chloro-3-pentenyl) propyl{(phenylthio) [bis(2-chloro-3-pentenyloxy)phosphinylthio]methylene}phosphoranetrioate, obtained by reacting phenyl chlorodithioformate and bis(2-chloro-3-pentenyl) propyl phosphite.

Examples of products obtained when the trivalent phosphorus ester used as the starting material in the reaction with the chlorodithioformate reactant is a phosphonite ester having at least one aliphatic or halogen-substituted aliphatic radical bonded through an oxygen atom to the phosphorous atom are:

Diethyl [(p-bromophenylthio)(ethoxyphenylphosphinylthio)methylene]phenylphosphoranedioate, obtained by reacting p-bromophenyl chlorodithioformate with diethyl phenylphosphonite;

Dihexyl [(xylylthio)(hexyloxyhexylphosphinylthio) methylene]hexylphosphoranedioate, obtained by reacting xylyl chlorodithioformate with dihexyl hexylphosphonite;

Bis(2-bromopropyl){(naphthylthio)[2-bromopropoxy) propylphosphinylthio]methylene}propylphosphoranedioate, obtained by reacting naphthyl chlorodithioformate with bis(2-bromopropyl) propylphosphonite;

Cyclohexyl ethyl{(phenylthio)(cyclohexyloxyethylphosphinylthio)methylene]ethylphosphoranedioate, obtained by reacting phenyl chlorodithioformate and cyclohexyl ethyl ethylphosphonite;

Bis(2-butenyl){(p-iodophenylthio)[(2-butenyloxy)(2-butenyl)phosphinylthio]methylene}(2-butenyl)phosphoranedioate, obtained by reacting p-iodophenyl chlorodithioformate with bis(2-butenyl) 2-butenylphosphonite; and Bis(3-hexynyl){(biphenylthio)[(3-hexynyloxy)(3-hexynyl)phosphinylthio]methylene}(3-hexynylphosphoranedioate, obtained by reacting biphenyl chlorodithioformate with bis(3-hexynyl) 3-hexynylphosphonite.

When the trivalent phosphorous ester used as the starting material in the reaction of this invention is a phosphinite ester having one aliphatic or halogen-substituted aliphatic radical bonded through an oxygen atom to the phosphorous atom, the product obtained is a phosphoranoic acid ester, a few examples of which are:

Propyl[(phenylthio)(dipropylphosphinylthio)methylene]dipropylphosphoranoate, obtained by reacting phenyl chlorodithioformate with propyl dipropylphosphinite;

2-chlorobutyl[(naphthylthio)(diphenylphosphinylthio) methylene]diphenylphosphoranoate, obtained by reacting naphthyl chlorodithioformate and 2-chlorobutyl diphenylphosphinite;

Allyl[(p-chlorophenylthio)(diallylphosphinylthio)methylene]diallylphosphoranoate, obtained by reacting p-chlorophenyl chlorodithioformate and allyl diallylphosphinite; and Amyl{(p-tolylthio)[bis(2-pentynyl)phosphinylthio] methylene}bis(2-pentynyl)phosphoranoate, obtained by reacting p-tolyl chlorodithioformate with amyl bis (2-pentynyl)phosphinite.

Formation of the desired product, that is, a phosphoranoate ester of the above defined type is accompanied by the formation of a halogenated alkane by-product. Thus, the reaction of, say, phenyl chlorodithioformate and triethyl phosphite gives ethyl chloride as a by-product;

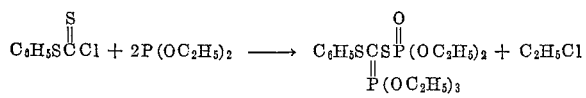

The by-product halogenated alkanes are generally articles of commerce for which many applications exist. Thus, while many currently employed processes for the manufacture of organic compounds of phosphorus entail substantial waste of halogen in that by-products of little commercial importance are formed, in the present process all of the halogen constituent of the raw materials is converted to products of economic importance.

Reaction of esters of trivalent phosphorus acids with aryl, halogen-substituted aryl, or alkaryl chlorodithioformates occurs readily at ordinary, decreased, or increased temperatures within the range of about 0° C. to about 150° C., with temperatures on the order of from 20° C. to 75° C. being preferred in most cases. Although cooling is not necessary, once the reaction has started, it is usually preferred to apply some cooling to minimize the formation of decomposition products that might result from operation at unnecessarily high temperatures. When employing the more active compounds, reaction may be essentially complete at ordinary temperature or below, but it is usually preferred to apply external heating after the initial exothermic reaction has subsided. The degree of heating will depend upon the nature of the reactants but will generally vary to below the decomposition point of the reaction mixture. Temperatures of up to 150° C. may be useful when employing the less reactive starting materials. In some instances, particularly when employing the higher molecular weight chlorodithioformate reactants, the use of an inert solvent or diluent is advantageous. Such inert solvents or diluents may be, for example, benzene, hexane, xylene, ether, etc. While the reactants are advantageously employed in stoichiometric proportions, such proportions need not be employed since any unreacted material is readily recovered from the reaction products.

The present phosphoranoate esters are stable, well defined compounds which range from viscous liquids to waxy or crystalline solids. They are particularly useful as the active ingredient in insecticidal compositions. As herein shown the present compounds are particularly toxic to mites and leaf-feeding insects when applied as a spray. They also possess significant systemic action. When using the compounds of the present invention in insecticidal compositions, or in other applications, removal of the by-product may be unnecessary. In fact, there may be advantages in retaining the by-products in the major product.

It will be understood that the terms "insect" and "insecticide" are used herein in their broad common usage to include spiders, mites, ticks, and like pests which are not in the strict biological sense classed as insects. Thus the usage herein conforms to the definitions provided by Congress in Public Law 104, the "Federal Insecticide, Fungicide, and Rodenticide Act" of 1947, Section 2, subsection *h*, wherein the term "insect" is used to refer not only to those small invertebrate animals belonging mostly to the class Insecta, comprising six-legged, usually winged forms, as beetles, bugs, bees, flies, and so forth, but also to other allied classes or arthropods whose members are wingless and usually have more than six legs, such as spiders, mites, ticks, centipedes, and wood lice.

Although the phosphoranoates of this invention are useful per se in controlling a wide variety of insect pests, it is preferable that they be supplied to the pests or to the environment of the pest or pests in a dispersed form in a suitable extending agent.

In the instant specification and appended claims it is to be understood that the term "dispersed" is used in its widest possible sense. When it is said that the phosphoranoates of this invention are dispersed, it means that the particles of the phosphoranoates of this invention may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g., pellets, granules, powders, or dusts. The term "dispersed" also includes mixtures which are suitable for use as aerosols including solutions, suspensions, or emulsions of the phosphinates of this invention in a carrier such as dichlorodifluoromethane and like fluorochloralkanes which boil below room temperature at atmospheric pressure.

In the instant specification and appended claims it is to be understood that the expression "extending agent" includes any and all of those substances in which the phosphinates of this invention are dispersed. It includes, therefore, the solvents of a true solution, the liquid phase of suspensions, emulsions or aerosols, the semi-solid carrier of ointments and the solid phase of a particulate solids, e.g. pellets, granules, dusts and powders.

The exact concentration of the phosphoranoates of this invention employed in combatting or controlling insect pests can vary considerably provided the required dosage (i.e. toxic or lethal amount) thereof is supplied to the pests or to the environment of the pests. When the extending agent is a liquid or mixture of liquids (e.g. as in solutions, suspensions, emulsions or aerosols) the concentration of the phosphoranoates employed to supply the desired dosage generally will be in the range of 0.001 to 50 percent by weight. When the extending agent is a semi-solid or solid, the concentration of the phosphoranoates employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g. powdered clay or talc) or other low-cost material available to the agriculturist at the point of use, he will have an easily prepared insecticidal spray or particulate solid. In such a concentrate composition, the phosphoranoate generally will be present in a concentration of 5 to 95 percent by weight, the residue being any one or more of the well-known insecticidal adjuvants, such as the various surface-active agents (e.g., detergents, a soap or other emulsifying or wetting agent, surface-active clays), solvents, diluents, carrier media, adhesives, spreading agents, humectants, and the like.

There are a large number of organic liquids which can be used for the preparation of solutions, suspensions, or emulsions of the phosphoranoates of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated napthalenes, solvent naptha, benzene, toluene, xylene, petroleum fractions (e.g. those boiling almost entirely under 400° F. at atmospheric pressure and having a flash point above 80° F., particularly kerosene), mineral oils having an unsulfonatable residue above about 80 percent and preferably above about 90 percent. In those instances wherein there may be concern about the phytoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixtue of organic liquids as the extending agent.

When the phosphoranoates of this invention are to be supplied to the insect pests or to the environment of the pests as aerosols, it is convenient to dissolve them in a suitable solvent and disperse the resulting solution in dichlorodifluoromethane or like chlorofluoroalkane which boils below room temperature at atmospheric pressure.

The phosphoranoates of this invention are preferably supplied to the insect pests or to the environment of the insect pests in the form of emulsions or suspensions. Emulsions or suspensions are prepared by dispering the phosphoranoate of this invention either per se or in the form of an organic solution thereof in water with the aid of a water-soluble surfactant. The term "surfactant" as employed here and in the appended claims is used as in volume II of Schwartz, Perry and Bertch's "Surface Active Agents and Detergents" (1958, Interscience Publishers, Inc., New York) in place of the expression "emulsifying agent" to connote generically the various "emulsifying agents," "dispersing agents," "wetting agents" and "spreading agents," that are adapted to be admixed with the active ingredients in the water vehicle or carrier in which they are insoluble through lowering the surface tension of the water (see also Frear, "Chemistry of Insecticides, Fungicides and Herbicides," second edition, page 280). These surfactants include the well-known capillary-active substances which may be anion-active (or anionic), cation-active (or cationic), or non-ionizing (or non-ionic), which are described in detail in volumes I and II of Schwartz, Perry and Bertch's "Surface Active Agents and Detergents" (1958, Interscience Publishers, Inc., New York) and also in the November 1947 issue of Chemical Industries (pages 811–842) in an article entitled "Synthetic Detergents" by John W. McCutcheon, and also in the July, August, September and October 1952 issues of Soap and Sanitary Chemicals under the title "Synthetic Detergents." The disclosures of these articles with respect to surfactants, i.e. the anion-active, cation-active and non-ionizing capillary active substances, are incorporated in this specification by reference in order to avoid unnecessary enlargement of this specification. The preferred surfactants are the water-soluble anionic surface active agents and the water soluble non-ionic surface-active agents set forth in U.S. 2,846,398 (issued August 5, 1958). In general it is preferred that a mixture of water-soluble anionic and water-soluble non-ionic surfactants be employed.

The phosphoranoates of this invention can be dispersed by suitable methods (e.g., tumbling or grinding) in solid extending agents either of organic or inorganic nature and supplied to the insect pest environment in particulate form. Such solid materials include, for example, tricalcium phosphate, calcium carbonate, kaolin, bole, kieselguhr, talc, bentonite, fuller's earth, pyrophyllite, diatomaceous earth, calcined magnesia, volcanic ash, sulfur and the like inorganic solid materials, and include, for example, such materials of organic nature as powdered cork, powdered wood, and powdered walnut shells. The preferred solid carriers are the adsorbent clays, e.g. bentonite. These mixtures can be used for insecticidal purposes in the dry form, or, by addition of water-soluble surfactants or wetting agents the dry particulate solids can be rendered wettable by water so as to obtain stable aqueous dispersions or suspensions suitable for use as sprayable compositions.

For special purposes the phosphoranoates of this invention can be dispersed in a semi-solid extending agent such as petrolatum or soap (e.g., sodium stearate or oleate or palmitate or mixtures thereof) with or without the aid of solubility promotors and/or surfactants or dispersing agents.

In all of the forms described above the dispersions can be provided ready for use in combatting insect pests or they can be provided in a concentrated form suitable for mixing with or dispersing in other extending agents.

As illustrative of a particularly useful concentrate is an intimate mixture of phosphoranoates of this invention with a water-soluble surfactant which lowers the surface tension of water in the weight proportions of 0.1 to 15 parts of surfactant with sufficient of the phosphoranoate of this invention to make 100 parts by weight. Such a concentrate is particularly adapted to be made into a spray for combatting various forms of insect pests (particularly mites) by the addition of water thereto. As illustrative of such a concentrate is an intimate mixture of 95 parts by weight of trimethyl [(phenylthio)(dimethoxyphosphinylthio) methylene] phosphoronetroate and 5 parts by weight of a water-soluble non-ionic surfactant such as the polyoxyethylene derivative of sorbitan monolaurate.

Another useful concentrate adapted to be made into a spray for combatting insect pests (particularly mites) is a solution (preferably as concentrated as possible) of a phosphoranoate of this invention in an organic solvent therefor. The said liquid concentrate preferably contains dissolved therein a minor amount (e.g., 0.5 to 10 percent by weight of the weight of the new insecticidal agent) of a surfactant (or emulsifying agent), which surfactant is also water-soluble. As illustrative of such a concentrate is a solution of triethyl [(pentachlorophenylthio) (diethoxyphosphinylthio)methylene] phosphoranetrioate in benzene which solution contains dissolved therein a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well known water-soluble alkylaryl sulfonates, e.g. sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water soluble polyoxyethylene derivatives of the mono-higher fatty acid esters of sorbitan.

In all the various dispersions described hereinbefore for insecticidal purposes, the active ingredient can be one or more of the compounds of this inventon. The compounds of this invention can also be advantageously employed in combination with other pesticides, including for example, nematocides, bacterocides, fungicides, and herbicides. In this manner it is possible to obtain mixtures which are effective against a wide variety of pests and other forms of noxious life.

In controlling or combatting insect pests the phosphoranoates of this invention either per se or compositions comprising same are supplied to the insect pests or to their environment in a lethal or toxic amount. This can be done by dispersing the new insecticidal agent or insecticidal composition comprising same in, on or over an infested environment or in or over an environment the insect pests frequent, e.g. agricultural soil or other growth media or other media infested with the insect pests or attractable to the pests for habitational or sustenance or propagational purposes, in any conventional fashion which permits contact between the insect pests and the phosphoranoates of this invention. Such dispersing can be brought about by applying the new phosphoranoates per se or sprays or particulate solid compositions containing same to a surface infested with the insect pests or attractable to the pests, as for example, the surface or a agricultural soil or other media such as the above ground surface of plants by any of the conventional methods, e.g. power dusters, broom and hand sprayers, and spray dusters. Also for sub-surface application such dispersing can be carried out by simply mixing the new insecticidal agent per se or insecticidal spray or particulate solid composition comprising same with the infested environment or with the environment the insect pests frequent, or by employing a liquid carrier for the new insecticidal agent to accomplish sub-surface penetration and impregnation thereof therein.

The invention is further illustrated, but not limited, by the following examples.

*Example 1*

A 27.1 g. (0.075 mole) portion of pentachlorophenyl chlorodithioformate and 75 ml. of benzene were placed in a 500 ml. flask and stirred as 26.6 g. (0.16 mole) of redistilled triethyl phosphite was added in about 2 minutes. The temperature increased spontaneously to 47° C. The reaction mixture was stirred for 0.75 hour and then warmed to 70° C. Most of the benzene was removed under water pump vacuum. The residue crystallized to a yellow solid. This was recrystallized from hexane to obtain 38.0 g of a light yellow solid, M.P. 106–107° C., which was triethyl [(pentachlorophenylthio) (diethoxyphosphinylthio)methylene] phosphoranetrioate,

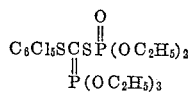

|  | Found | Anal. Calc'd for $C_{17}H_{25}Cl_5O_6P_2S_2$ |
|---|---|---|
| Percent C | 32.63 | 32.5 |
| Percent H | 4.17 | 4.0 |
| Percent Cl | 28.20 | 28.2 |
| Percent P | 9.76 | 9.8 |
| Percent S | 10.04 | 10.2 |

*Example 2*

To a 500 ml. flask was charged 18.0 g. (0.05 mole) of pentachlorophenyl chlorodithioformate and 150 ml. of benzene. Diethyl phenylphosphonite, 21.8 g. (0.11 mole), was then added in 0.2 hour with cooling at 20 to 32° C. The reaction mixture was warmed to 70° C. and concentrated under vacuum. The yellow residue was recrystallized from hexane to give 28.2 g. of a yellow solid, M.P. 127–128° C., which was diethyl [(pentachlorophenylthio) (ethoxyphenylphosphinylthio) methylene]phenylphosphoranedioate

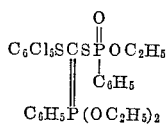

|  | Found | Anal. Calc'd for $C_{25}H_{25}Cl_5O_4P_2S_2$ |
|---|---|---|
| Percent C | 43.32 | 43.3 |
| Percent H | 3.82 | 3.6 |
| Percent Cl | 25.45 | 25.6 |
| Percent P | 8.90 | 8.9 |
| Percent S | 9.19 | 9.2 |

*Example 3*

A 10.5 g. (0.0490 mole) portion of methyl diphenylphosphinite and 50 ml. of benzene were placed in a flask, and 4.6 g. (0.0245 mole) of phenyl chlorodithioformate was added all at once at 24° C. The temperature increased spontaneously to 44° C. The reaction mixture was warmed to 70° C. and then concentrated to 60° C./1 mm. to give a tan residue. This was crystallized three times from hexane-benzene to give a white crystalline solid, M.P. 166–168° C. The product was methyl [(phenylthio) (diphenylphosphinylthio) methylene]diphenylphosphoranoate

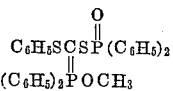

|  | Found | Anal. Calc'd for $C_{32}H_{28}O_2P_2S_2$ |
|---|---|---|
| Percent C | 67.68 | 67.40 |
| Percent H | 4.96 | 4.95 |
| Percent Cl | 0.00 | 0.00 |
| Percent P | 10.63 | 10.88 |
| Percent S | 11.00 | 11.23 |

*Example 4*

Freshly distilled triethyl phosphite, 415 g. (2.5 moles), was placed in a dry, 1-liter, 4-necked flask and cooled and stirred as the addition of 226.5 g. (1.2 moles) of phenyl chlorodithioformate was started at 10° C. The temperature of the mixture was allowed to increase until at about 20° C. to 25° C. an exothermic reaction set in, and the temperature increased spontaneously to 43° C. even while cooling in ice. The remainder of the formate reactant was then added in about 0.5 hour while cooling in ice at 35 to 40° C. When the bath was removed after addition, the temperature increased spontaneously to 49° C. The reaction mixture was stirred and warmed to 70° C. in 0.5 hour and then concentrated to a temperature of 91° C./2 mm. with stirring to give 555.5 g. (theoretical 548 g.). This residue had an index of refraction of $n_D^{25}$ 1.5310 and was substantially pure triethyl [(phenylthio)(diethoxyphosphinylthio)methylene]phosphoranetrioate, having the structure

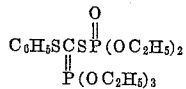

|  | Found | Anal. Calc'd for $C_{17}H_{30}O_6P_2S_2$ |
|---|---|---|
| Percent C | 44.84 | 44.8 |
| Percent H | 6.78 | 6.6 |
| Percent P | 13.59 | 13.6 |
| Percent S | 14.29 | 14.0 |

*Example 5*

Tris(2-chloropropyl) phosphite, 43.5 g. (0.140 mole), was placed in a flask and stirred as 15.6 g. (0.070 mole) of p-chlorophenyl chlorodithioformate was added in 0.1 hour. The temperature increased spontaneously to 51° C. When the exothermic reaction had subsided, the mixture was warmed to 100° C./0.5 mm. to give as residue 50.7 g. (99% of theory) of substantially pure tris (2 - chloropropyl){(p - chlorophenylthio)[bis(2 - chloropropoxy)phosphinylthio]methylene}phosphoranetrioate

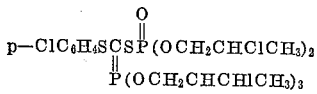

which analyed as follows:

|  | Found | Anal. Calc'd for $C_{22}H_{34}Cl_5O_6P_2S_2$ |
|---|---|---|
| Percent C | 35.86 | 36.1 |
| Percent H | 4.89 | 4.7 |
| Percent Cl | 29.13 | 29.1 |
| Percent P | 8.28 | 8.4 |
| Percent S | 8.63 | 8.7 |
| Percent O | 13.21 (by difference) | 13.1 |

*Example 6*

Freshly distilled triethyl phosphite, 207.5 g. (1.25 moles) was placed in a reaction flask and stirred and cooled as 133.8 g. (0.60 mole) of p-chlorophenyl chlorodithioformate was added in 0.3 hour at 35 to 40° C.

The temperautre increased spontaneously to 48° C. when the bath was removed. The reaction mixture was then warmed to 90° C. and finally concentrated to a pot temperature of 120° C./0.05 mm. to give 296.4 g. (theoretical, 294 g.) of an orange liquid residue which was substantially pure triethyl [(p - chlorophenylthio)(diethoxyphosphinylthio)methylene]phosphoranetrioate,

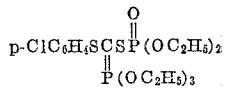

Example 7

Redistilled trimethyl phosphite, 62 g. (0.50 mole), was placed in a flask, and 45.0 g. (0.20 mole) of p-chlorophenyl chlorodithioformate was added in 0.2 hour with cooling at 18 to 30° C. After the addition was completed, cooling was used for about 0.1 hour to keep the temperature below 35° C. The yellow reaction mixture was then warmed at 60 to 65° C. for 0.5 hour and then concentrated with stirring to a pot temperature of 100° C./0.1 mm. to give 80.5 g. (theoretical 85.0 g.) of a yellow viscous liquid residue, $n_D^{25}$ 1.5689, which was trimethyl [(p - chlorophenylthio)(dimethoxyphosphinylmethylene]phosphoranetrioate,

Example 8

Hexane (100 ml.) and 14.1 g. (0.075 mole) of phenylchlorodithioformate were placed in a reaction flask, cooled in ice, and then 24.8 g. (0.20 mole) of trimethyl phosphite was added in 0.2 hour at 3 to 4° C. The temperature was allowed to rise until at about room temperature an exothermic reaction set in, raising the temperature to about 35° C. After the exothermic reaction had subsided, the reaction mixture was refluxed (about 67° C.). After refluxing for 0.5 hour, the hexane was distilled until the pot temperature reached 74° C. The residue was concentrated to 105° C./1 mm., giving 29.2 g. of a red liquid having an index of refraction of $n_D^{25}$ 1.5539. The product was trimethyl [(phenylthio)(dimethoxyphosphinylthio)-methylene[phosphoranetrioate,

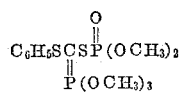

Example 9

Testing of samples of the compound trimethyl [(phenylthio)(dimethoxyphosphinylthio)methylene]phosphoranetrioate as a plant spray insecticide was conducted as follows. Emulsion concentrates were prepared by dissolving first the compound and then an emulsifying agent in acetone. Water was added to the concentrate to give a preparation containing 0.1% (w./v.) of the test chemical. Serial dilutions of 0.05% and 0.025% were prepared by addition of appropriate volumes of water and emulsifier so that the emulsifier concentration remained constant. In each case the emulsifier, employed in a quantity of 0.02% by weight, based on the weight of the total emulsion, was a mixture of a higher alkylbenzenesulfonate and a polyalkylene glycol known to the trade as "Emulsifier L." Potted bean plants were respectively sprayed to run-off with the emulsions. As soon as the foliage of the sprayed bean plants was dry, leaves were excised, the petioles placed in water filled vials, and ten larvae of the Mexican bean bettle placed on the leaf. Observations for mortality were made after 48 hours. This results were as follows:

| Percent Weight/Volume | Percent Kill |
|---|---|
| 0.1 | 90 |
| 0.05 | 100 |
| 0.0025 | 90 |

In still another insecticide test, bean plants which had been infested with the 2-spotted spider mite were sprayed with similarly prepared 0.013% and 0.0063%, respectively, emulsions of the compound trimethyl [(phenylthio)(dimethoxyphosphinylthio)methylene]phosphoranetrioate. The sprayed plants were held 48 hours for observation of kill of mobile stages and 7 days for observation for kill of resting forms and eggs and to determine residual effect on the population. At the end of that period, plants which had been sprayed with the 0.013% and the 0.0063% emulsions of the test compound gave the following results:

| 2-Spotted Spider Mite | Percent Kill at Concentration of Test Compound | |
|---|---|---|
| | 0.013% by wt. | 0.0063% by wt. |
| Mobile Stages | 100 | 97 |
| Resting Stages | 97 | 97 |
| Eggs | 97 | 50 |
| Residual Activity | 97 | 50 |

In still another evaluation of this compound, a 0.001% (w./v.) solution gave a 96% kill of larvae of the yellow fever mosquito.

The systemic insecticidal effect of this compound on bean bettle larvae and 2-spotted spider mites, was tested as follows. Black Valentine bean plants in the second leaf stage were cut and held for 3 days in duplicate respective aqueous solutions of 0.004% by weight concentration of trimethyl [(phenylthio)(dimethoxyphosphinylthio)-methylene]phosphoranetrioate. The leaves were then excised with long petioles and transferred to fresh water and five Mexican bean beetle larvae were transferred to each of one set of duplicate test plants and 20 to 50 mites to the other of the duplicate test plants. Observation at the end of 3 days showed a 100% kill of the beetles and a 97% kill of the mites.

Example 10

Emulsions of triethyl [(phenylthio)(diethoxyphosphinylthio)methylene]phosphoranetrioate were prepared in a manner similar to that used in the preceding example.

In one test, this compound was evaluated against yellow fever mosquito larvae and gave the following results.

| Percent Concentration | Percent Kill |
|---|---|
| 2.5×10⁻⁴ | 100 |
| 1.3×10⁻⁴ | 96, 88 |
| 6.3×10⁻⁵ | 36 |

In another test, when the compound was sprayed on bean plants which had been infested with 2-spotted spider mites, the following results were obtained:

| Two-Spotted Spider Mite | Percent Kill at the Indicated Concentration | |
|---|---|---|
| | 0.025% | 0.013% |
| Mobile Stages | 100 | 100 |
| Resting Stages | 100 | 100 |
| Eggs | 100 | 97 |
| Residual Activity | 100 | 50 |

In another test of the compound, varying concentrations (from 1% acetone solution) were evaluated for residual action against large milkweed bug nymphs (*Oncopeltus fasciatus*), and red flour beetle adults (*Tribolium confusium*).

| Organism | Percent Kill at the Indicated Concentration | | | |
| --- | --- | --- | --- | --- |
|  | 1.0% | 0.5% | 0.25% | 0.13% |
| Milkweed Bugs | 100 | 100 | 100 | 80 |
| Red Flour Beetles | 80 | 80 |  |  |

While this invention has been described with respect to certain embodiments, it is to be understood that it is not so limited and that variations and modifications thereof obvious to those skilled in the art can be made without departing from the spirit and scope thereof.

This application is a continuation-in-part of co-pending application S.N. 39,239, filed June 28, 1960, now U.S. Patent 3,089,891.

I claim:

1. An insecticidal composition comprising a phosphoranoate compound having the formula

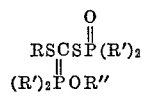

wherein R is selected from the group consisting of aryl, haloaryl, and alkylaryl having from 6 to 12 carbon atoms in each of said aryl, haloaryl and alkylaryl, R' is selected from the group consisting of hydrocarbon, hydrocarbonoxy, and halohydrocarbonoxy having from 1 to 6 carbon atoms, and R" is selected from the group consisting of aliphatic hydrocarbon and halogen-substituted aliphatic hydrocarbon having from 1 to 6 carbon atoms dispersed in a medium selected from the group consisting of semi-solid and solid extending agents in which semi-solid and solid dispersion compositions, the phosphoranoate compound is present in from about 0.1 to 25 percent by weight, based on the weight of the total composition, and organic liquid solvents therefor in which solutions there is dissolved a minor amount of a surfactant, and in which solutions the phosphoranoate compound is present in from about 0.001 to about 50 percent by weight, based on the weight of the total composition.

2. An insecticidal composition as described in claim 1 wherein the phosphoranoate compound is dispersed in a semi-solid extending agent, the composition containing 0.1 to 25 percent by weight of said phosphoranoate compound.

3. An insecticidal composition as described in claim 1, wherein the phosphoranoate compound is dispersed in a solid extending agent, the composition containing 0.1 to 25 percent by weight of said phosphoranoate compound.

4. An insecticidal composition as described in claim 1 wherein the phosphoranoate compound is dispersed in an adsorbent clay, the composition containing 0.1 to 25 percent by weight of said phosphoranoate compound.

5. An insecticidal composition as described in claim 1 wherein R is aryl having from 6 to 12 carbon atoms, R' is hydrocarbonoxy having from 1 to 6 carbon atoms, and R" is aliphatic hydrocarbon having from 1 to 6 carbon atoms.

6. An insecticidal composition as described in claim 5, wherein the phosphoranoate is trimethyl [phenylthio(dimethoxyphosphinylthio)methylene]phosphoranetrioate of the structure

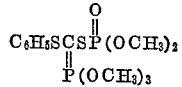

7. An insecticidal composition as described in claim 5, wherein the phosphoranoate is triethyl [phenylthio(diethoxyphosphinylthio)methylene]phosphoranetrioate of the structure

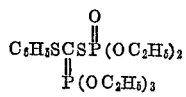

8. An insecticidal concentrate comprising a phosphoranoate compound as described in claim 5, dispersed in an organic solvent therefor and having dissolved therein a minor amount of a surfactant, said concentrate forming an emulsion with water upon agitation therewith.

9. An insecticidal concentrate adapted to be made into a sprayable composition by the addition of water comprising a phosphoranoate compound as described in claim 5, in admixture with a water-soluble surfactant in the weight proportion of 0.1 to 15 parts of surfactant and sufficient of said phosphoranoate compound to make 100 parts by weight.

10. An insecticidal composition as described in claim 1 wherein R is haloaryl having from 6 to 12 carbon atoms, R' is hydrocarbonoxy having from 1 to 6 carbon atoms, and R" is aliphatic hydrocarbon having from 1 to 6 carbon atoms.

11. An insecticidal composition as described in claim 10, wherein the phosphoranoate is triethyl [pentachlorophenylthio (diethoxyphosphinylthio) methylene] phosphoranetrioate of the structure

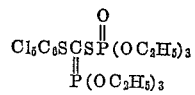

12. An insecticidal composition as described in claim 1 where R is aryl having from 6 to 12 carbon atoms, R' is hydrocarbon having from 1 to 6 carbon atoms, and R" is aliphatic hydrocarbon having from 1 to 6 carbon atoms.

13. An insecticidal composition as described in claim 12, wherein the phosphoranoate is methyl [phenylthio (diphenylphosphinylthio) methylene] diphenylphosphoranoate of the structure

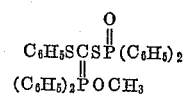

14. An insecticidal composition as described in claim 1 wherein R is haloaryl having from 6 to 12 carbon atoms, one R' is hydrocarbonoxy having from 1 to 6 carbon atoms and the other R' is hydrocarbon having from 1 to 6 carbon atoms, R" is aliphatic hydrocarbon having from 1 to 6 carbon atoms.

15. An insecticidal composition as described in claim 14, wherein the phosphoranoate is diethyl [pentachlorophenylthio (ethoxyphenylphosphinylthio) methylene] phosphoranedioate of the structure

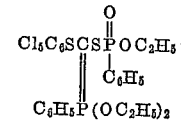

16. The method of controlling insects which comprises contacting the insects with a lethal amount of a phosphoranoate compound described in claim 1.

17. The method of controlling insects which comprises contacting the insects with a lethal amount of a phosphoranoate compound described in claim 5.

18. The method for protection of plants against insect attack which comprises applying to the plant an insecticidal amount of at least one phosphoranoate compound described in claim 5.

References Cited in the file of this patent

UNITED STATES PATENTS

| 2,807,636 | Buls et al. | Sept. 24, 1957 |
| --- | --- | --- |
| 2,857,305 | Birum | Oct. 21, 1958 |
| 2,857,415 | Birum | Oct. 21, 1958 |
| 2,891,887 | Gilbert | June 23, 1959 |